US008806111B2

(12) United States Patent
Whitney

(10) Patent No.: US 8,806,111 B2
(45) Date of Patent: Aug. 12, 2014

(54) APPARATUS, SYSTEM, AND METHOD FOR BACKING DATA OF A NON-VOLATILE STORAGE DEVICE USING A BACKING STORE

(75) Inventor: Nathan M. Whitney, West Jordan, UT (US)

(73) Assignee: Fusion-io, Inc., Salt Lake City, UT (US)

( * ) Notice: Subject to any disclaimer, the term of this patent is extended or adjusted under 35 U.S.C. 154(b) by 187 days.

(21) Appl. No.: 13/332,074

(22) Filed: Dec. 20, 2011

(65) Prior Publication Data

US 2013/0159603 A1 Jun. 20, 2013

(51) Int. Cl.
*G06F 12/00* (2006.01)

(52) U.S. Cl.
USPC ............ 711/103; 711/114; 711/162; 711/170

(58) Field of Classification Search
None
See application file for complete search history.

(56) References Cited

U.S. PATENT DOCUMENTS

| | | | |
|---|---|---|---|
| 8,074,011 B2 | 12/2011 | Flynn et al. | |
| 8,195,912 B2 | 6/2012 | Flynn et al. | |
| 8,402,201 B2 | 3/2013 | Flynn et al. | |
| 8,464,106 B2 * | 6/2013 | Filor et al. | 714/723 |
| 2006/0285397 A1 * | 12/2006 | Nishihara et al. | 365/185.33 |
| 2008/0183966 A1 * | 7/2008 | Shim et al. | 711/115 |
| 2009/0132616 A1 * | 5/2009 | Winter et al. | 707/204 |
| 2013/0024641 A1 | 1/2013 | Talagala et al. | |

* cited by examiner

*Primary Examiner* — Shawn X Gu
(74) *Attorney, Agent, or Firm* — Meyertons, Hood, Kivlin, Kowert & Goetzel, P.C.

(57) ABSTRACT

Methods, storage controllers, and systems for backing data of a non-volatile storage device using a backing store are described. One method includes satisfying storage operations using a non-volatile storage device, determining an age for data stored on the non-volatile storage device, and copying data of the non-volatile storage device having an age that satisfies a data retention time threshold to a dedicated backing store. One storage controller includes an operations module that satisfies storage operations using a non-volatile storage device, an age module that determines an age for data stored on the non-volatile storage device, and a backup module that copies data of the non-volatile storage device having an age that satisfies a data retention time threshold to a dedicated backing store.

17 Claims, 9 Drawing Sheets

APPARATUS, SYSTEM, AND METHOD FOR BACKING DATA OF A NON-VOLATILE STORAGE DEVICE USING A BACKING STORE

BACKGROUND OF THE INVENTION

1. Field of the Invention

This invention relates to data storage devices and more particularly relates to backing data of a non-volatile storage device using a backing store.

2. Description of the Related Art

Though they may generally be characterized as nonvolatile, some solid-state storage devices are unable to retain data indefinitely. For example, NAND flash devices are susceptible to retention errors in which charge trapped on a floating gate of the memory cell eventually dissipates over an extended period. Since the charge represents data, as charge dissipates, data stored by the solid-state storage device may include errors that are uncorrectable.

SUMMARY OF THE INVENTION

Embodiments of a method are described. In one embodiment, a method includes satisfying storage operations using a non-volatile storage device, determining an age for data stored on the non-volatile storage device, and copying data of the non-volatile storage device having an age that satisfies a data retention time threshold to a dedicated backing store. Other embodiments of the method are also described.

Embodiments of a storage controller are described. In one embodiment, a storage controller includes an operations module that satisfies storage operations using a non-volatile storage device and an age module that determines an age for data stored on the non-volatile storage device. The storage controller also includes a backup module that copies data of the non-volatile storage device having an age that satisfies a data retention time threshold to a dedicated backing store. Other storage controller embodiments are also described.

Embodiments of a system are described. In one embodiment, a system includes a non-volatile storage device, a dedicated backing store in communication with the non-volatile storage device, and a storage controller. The storage controller satisfies storage operations using a non-volatile storage device and determines an age for data stored on the non-volatile storage device. The storage controller also copies data of the non-volatile storage device having an age that satisfies a data retention time threshold to a dedicated backing store. Other systems embodiments are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
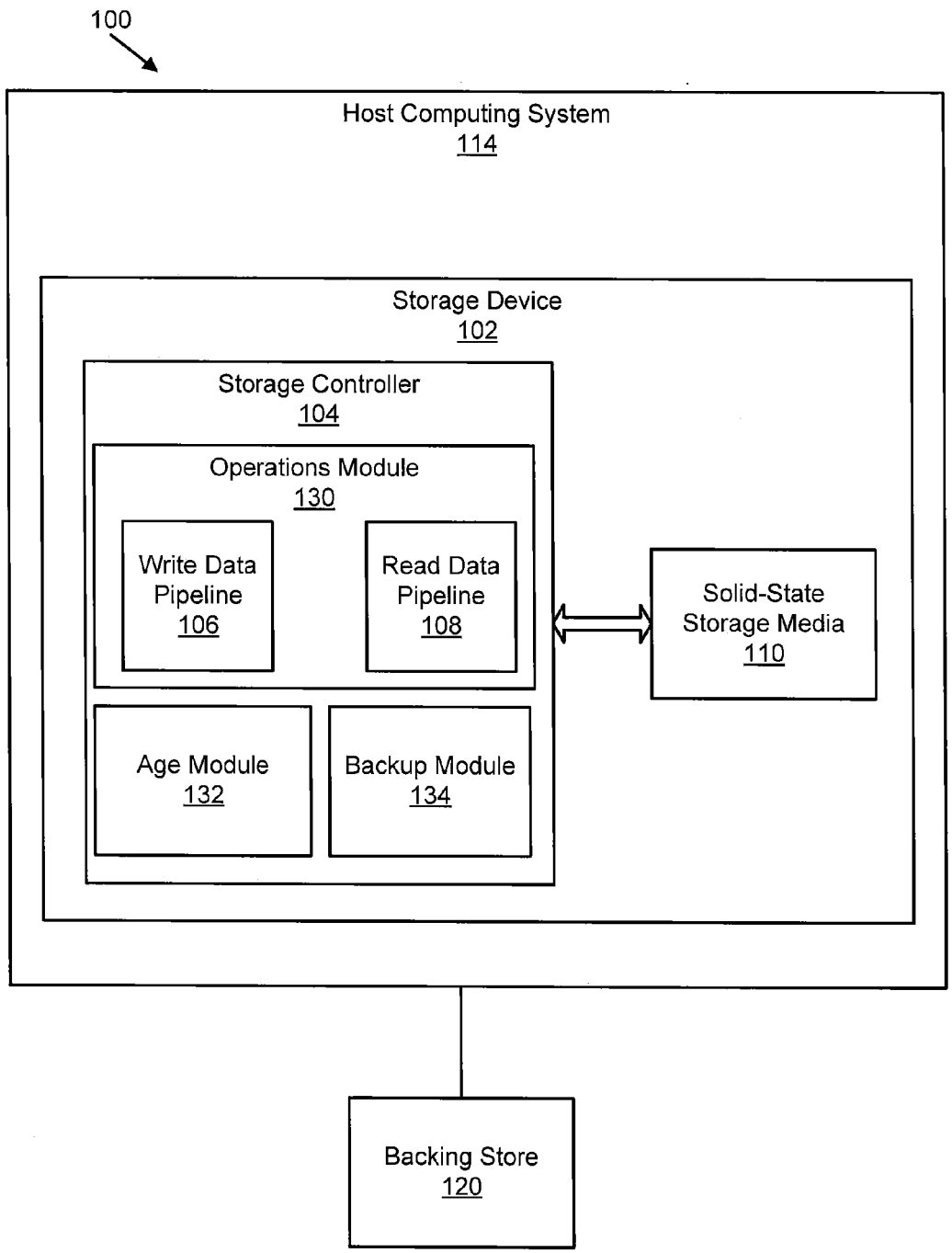
FIG. 1 is a schematic block diagram illustrating one embodiment of a system including a storage device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

System for Backing Data of a Non-Volatile Storage Device Using a Backing Store

FIG. 1 depicts one embodiment of a system 100 for backing data of a non-volatile storage device using a backing store. In the depicted embodiment, the system 100 includes a host computing system 114, a backing store 120, and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a nonvolatile solid-state storage device 102 comprising a solid-state storage controller 104, a write data pipeline 106, a read data pipeline 108, operations module 130, age module 132, backup module 134, and nonvolatile solid-state storage media 110. The storage device 102 may contain additional components that are not shown in order to provide a simpler view of the storage device 102.

The solid-state storage media 110 stores data such that the data is retained even when the storage device 102 is not powered. Examples of solid-state storage media 110 include flash memory, nano random access memory ("NRAM"), magneto-resistive RAM ("MRAM"), dynamic RAM ("DRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), and the like. While, in the depicted embodiment, the storage device 102 includes solid-state storage media 110, in other embodiments, the storage device 102 may include magnetic media such as hard disks, tape, and the like, optical media, or other nonvolatile data storage media. The storage device 102 also includes a storage controller 104 that coordinates the storage and retrieval of data in the solid-state storage media 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the solid-state storage media 110. These operations may include, for example, error correction code (ECC) generation, encryption, compression, and others. The read data pipeline 108 may perform similar and potentially inverse operations on data that is being read out of solid-state storage media 110 and sent to the host computing system 114.

In one embodiment, solid-state storage media 110 may be susceptible to retention errors. For example, in one embodiment, solid-state storage media 110 may include flash memory that stores data by storing electrical charge representing the data on floating gates of NAND flash cells. Although such cells reliably store data for long periods, charge stored on the floating gates may eventually dissipate after an extended period resulting in data loss. Such loss may be avoided by, for example, periodically reprogramming or otherwise refreshing data stored in the NAND flash cells.

As used herein, the term data retention time interval refers to an amount of time that solid-state storage media 110 may retain data without loss. The data retention time interval may vary significantly depending on the technology of the underlying memory cells of solid-state storage media 110. By way of example, the data retention time interval for some embodiments of solid-state storage media 110 may be several months.

One way of preventing data loss due to retention errors is to copy data stored by solid-state storage media 110 to backing store 120. In one embodiment, backing store 120 may use a different technology than solid-state storage media 110 for storing data. For example, backing store 120 may be a conventional disk drive, tape drive, or other nonvolatile storage device less susceptible to retention errors or having a significantly lower probability (e.g., several orders of magnitude lower) of retention errors. In other embodiments, backing store 120 may use a similar technology as solid-state storage media 110, but may have longer retention time. For example, in one embodiment, solid-state storage media 110 may include multi-level cell NAND flash media and backing store 120 may include single-level cell NAND flash media having a longer retention time than the multi-level cell NAND flash media. Accordingly, both solid-state storage media 110 and backing store 120 may both be solid-state media and in some cases may be located on the same card (e.g., printed circuit board or assembly). As will be described in further detail below, age module 132 and backup module 134 prevent retention errors in system 100 by copying (i.e., backing) data stored by solid-state storage media 110 to backing store 120 and in some cases copying backed data stored in backing store 120 to solid-state storage media 110.

In one embodiment, the host computing system 114 includes one or more other components in addition to the storage device 102, such as additional storage devices, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

Solid-State Storage Device

Figure 2:
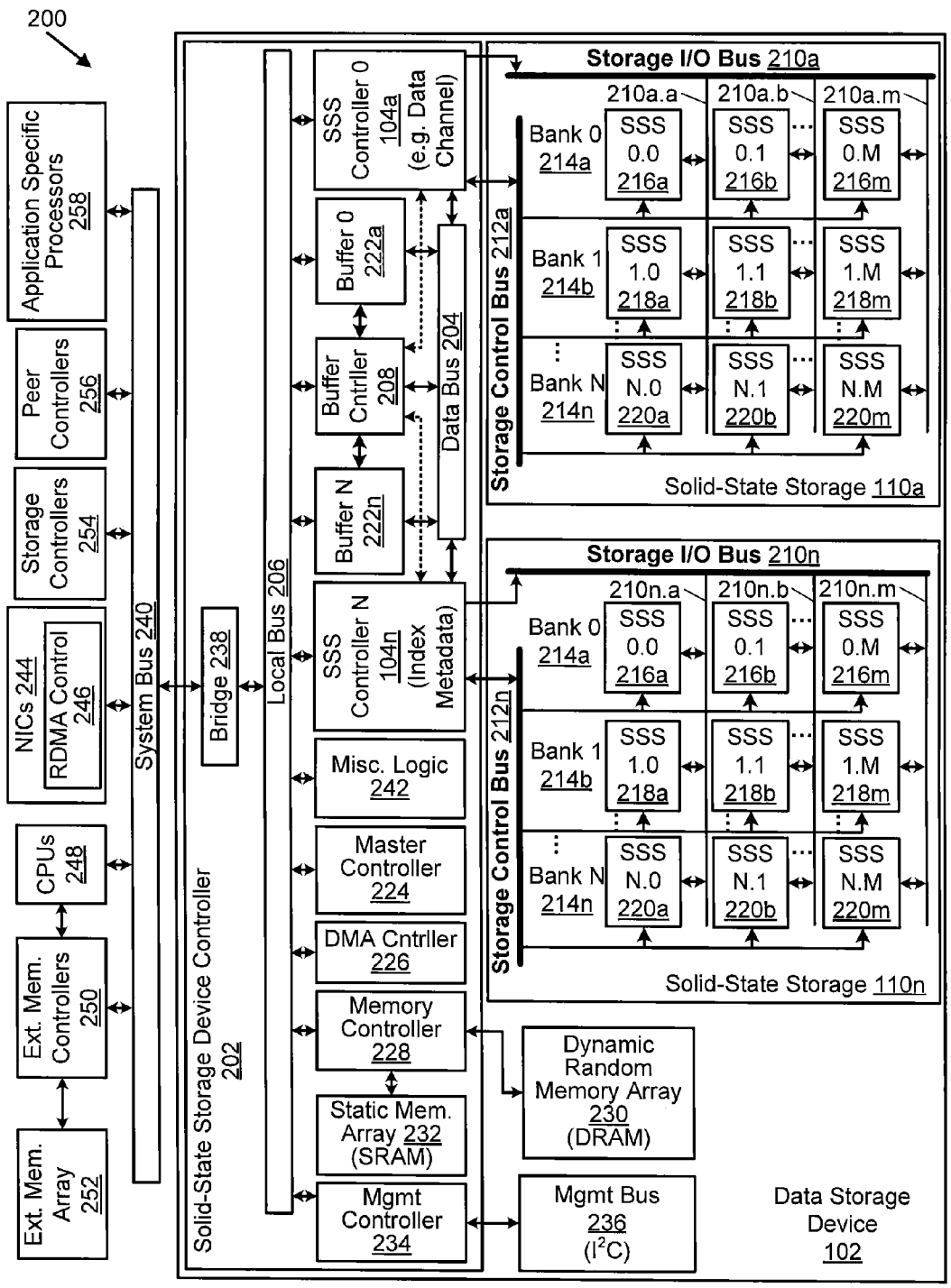
FIG. 2 is a schematic block diagram illustrating one embodiment of a solid-state storage device controller for a data storage device.

FIG. 2 is a schematic block diagram illustrating one embodiment 200 of a solid-state storage device controller 202 that includes a write data pipeline 106 and a read data pipeline 108 in a solid-state storage device 102 in accordance with the present invention. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controlling respective solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is a field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g., SSS 0.0 216a) is typically configured as a chip (a package of one or more dies) or a die on a circuit board. As depicted, a solid-state storage element (e.g., 216a) operates independently or semi-independently of other solid-state storage elements (e.g., 218a) even if these several elements are packaged together in a chip package, a stack of chip packages, or some other package element. As depicted, a row of solid-state storage elements 216a, 216b, 216m is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. Of course, different embodiments may include different values for n and m. In one embodiment, a solid-state storage media 110a includes twenty solid-state storage elements 216a-216m per bank 214 with eight banks 214. In one embodiment, the solid-state storage media 110a includes twenty-four solid-state storage elements 216a-216m per bank 214 with eight banks 214. In addition to the n×m storage elements 216a-216m, 218a-218m, 220a-220m, one or more additional columns (P) may also be addressed and operated in parallel with other solid-state storage elements 216a, 216b, 216m for one or more rows. The added P columns in one embodiment, store parity data for the portions of an ECC chunk (i.e., an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In one embodiment, solid-state storage elements that share a common line 211 on the storage I/O bus 210a (e.g., 216b, 218b, 220b) are packaged together. In one embodiment, a solid-state storage element 216, 218, 220 may have one or more dies per package with one or more packages stacked vertically and each die may be accessed independently. In another embodiment, a solid-state storage element (e.g., SSS 0.0 216a) may have one or more virtual dies per die and one or more dies per package and one or more packages stacked vertically and each virtual die may be accessed independently. In another embodiment, a solid-state storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a . . . 220a, each in a separate bank 214a, 214b . . . 214n. In another embodiment, 24 storage elements (e.g., SSS 0.0-SSS 0.24) 216a, 216b, . . . 216m form a logical bank 214a so that each of the eight logical banks has 24 storage elements (e.g., SSS0.0-SSS 8.24) 216, 218, 220. Data is sent to the solid-state storage media 110 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 is comprised of one or more independent I/O buses ("IIOBa-m" comprising 210a.a-m . . . 210n.a-m) wherein the solid-state storage elements within each column share one of the independent I/O buses that are connected to each solid-state storage element 216, 218, 220 in parallel. For example, one independent I/O bus 210a.a of the storage I/O bus 210a may be physically connected to a first solid-state storage element 216a, 218a, 220a of each bank 214a-n. A second independent I/O bus 210a.b of the storage I/O bus 210b may be physically connected to a second solid-state storage element 216b, 218b, 220b of each bank 214a-n. Each solid-state storage element 216a, 216b, 216m in a bank 214a (a row of solid-state storage elements as illustrated in FIG. 2) may be accessed simultaneously and/or in parallel. In one embodiment, where solid-state storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Solid-state storage elements 216, 218, 220 may also be selected through a combination of control signals and address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2048 bytes ("2 kB"). In one example, a solid-state storage element (e.g., SSS 0.0) includes two registers and can program two pages so that a two-register solid-state storage element 216, 218, 220 has a capacity of 4 kB. A bank 214 of 20 solid-state storage elements 216a, 216b, 216m would then have an 80 kB capacity of pages accessed with the same address going out the independent I/O buses of the storage I/O bus 210.

This group of pages in a bank 214 of solid-state storage elements 216a, 216b, . . . 216m of 80 kB may be called a logical page or virtual page. Similarly, an erase block of each storage element 216a, 216b, . . . 216m of a bank 214a may be grouped to form a logical erase block (which may also be called a virtual erase block). In one embodiment, an erase block of pages within a solid-state storage element is erased when an erase command is received within the solid-state storage element. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the solid-state storage element 216 to direct the packet to the designated location within the page. Since all storage elements in a column of storage elements (e.g., SSS 0.0-SSS N.0 216a, 218a, . . . 220a) are connected to the same independent I/O bus (e.g., 210.a.a) of the storage I/O bus 210a, to reach the proper page and to avoid writing the data packet to similarly addressed pages in the column of storage elements (SSS 0.0-SSS N.0 216a, 218a, . . . 220a), the bank 214a that includes the solid-state storage element SSS 0.0 216a with the correct page where the data packet is to be written is selected by the storage control bus 212a and other banks 214b . . . 214n of the solid-state storage 110a are deselected.

Similarly, satisfying a read command on the storage I/O bus 210 requires a signal on the storage control bus 212 to select a single bank 214a and the appropriate page within that bank 214*a*. In one embodiment, a read command reads an entire page, and because there are multiple solid-state storage elements 216*a*, 216*b*, . . . 216*m* in parallel in a bank 214*a*, an entire logical page is read with a read command. However, the read command may be broken into subcommands, as will be explained below with respect to bank interleave. Similarly, an entire logical page may be written to the solid-state storage elements 216*a*, 216*b*, . . . 216*m* of a bank 214*a* in a write operation.

An erase block erase command may be sent out to erase an erase block over the storage I/O bus 210 with a particular erase block address to erase a particular erase block. Typically, storage controller 104*a* may send an erase block erase command over the parallel paths (independent I/O buses 210*a-n.a-m*) of the storage I/O bus 210 to erase a logical erase block, each with a particular erase block address to erase a particular erase block. Simultaneously, a particular bank (e.g., Bank 0 214*a*) is selected over the storage control bus 212 to prevent erasure of similarly addressed erase blocks in non-selected banks (e.g., Banks 1-N 214*b-n*). Alternatively, no particular bank (e.g., Bank 0 214*a*) is selected over the storage control bus 212 (or all of the banks are selected) to enable erasure of similarly addressed erase blocks in all of the banks (Banks 1-N 214*b-n*) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage media 110. For example, storage controller 104*a* streams packets to storage write buffers of a bank 214*a* of storage elements 216 and, when the buffers are full, the packets are programmed to a designated logical page. Storage controller 104*a* then refills the storage write buffers with packets and, when full, the packets are written to the next logical page. The next logical page may be in the same bank 214*a* or another bank (e.g., 214*b*). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, a new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222*a-n*, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the solid-state storage controller(s) 104 communicate data to the solid-state storage media 110 over a storage I/O bus 210. In a typical embodiment where the solid-state storage is arranged in banks 214 and each bank 214 includes multiple storage elements 216*a*, 216*b*, 216*m* accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216*a*, 218*a*, 220*a*) may include a logical-to-physical mapping for storage divisions (e.g., erase blocks) accessed in a column of storage elements 216*a*, 218*a*, 220*a*. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222*a-n* controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104*a*-104*n*-1 and associated solid-state storage media 110*a*-110*n*-1 while at least one channel (solid-state storage controller 104*n*, solid-state storage media 110*n*) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110*a*-*n*, the master controller 224 divides the work load among internal controllers, such as the solid-state storage controllers 104*a*-*n*. For example, the master controller 224 may divide an object to be written to the data storage devices (e.g., solid-state storage media 110*a*-*n*) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple logical devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition, the DMA controller 226 may also control RDMA operations with requesting devices through a NIC 244 and associated RDMA controller 246.

In one embodiment, the solid-state storage device controller 202 includes a management controller 234 connected to a management bus 236. Typically, the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/solid-state storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically, where the solid-state device controller 202 or master controller 224 is/are configured using a FPGA or other configurable controller, custom logic may be included based on a particular application, customer requirement, storage requirement, etc.

Data Pipeline

Figure 3:
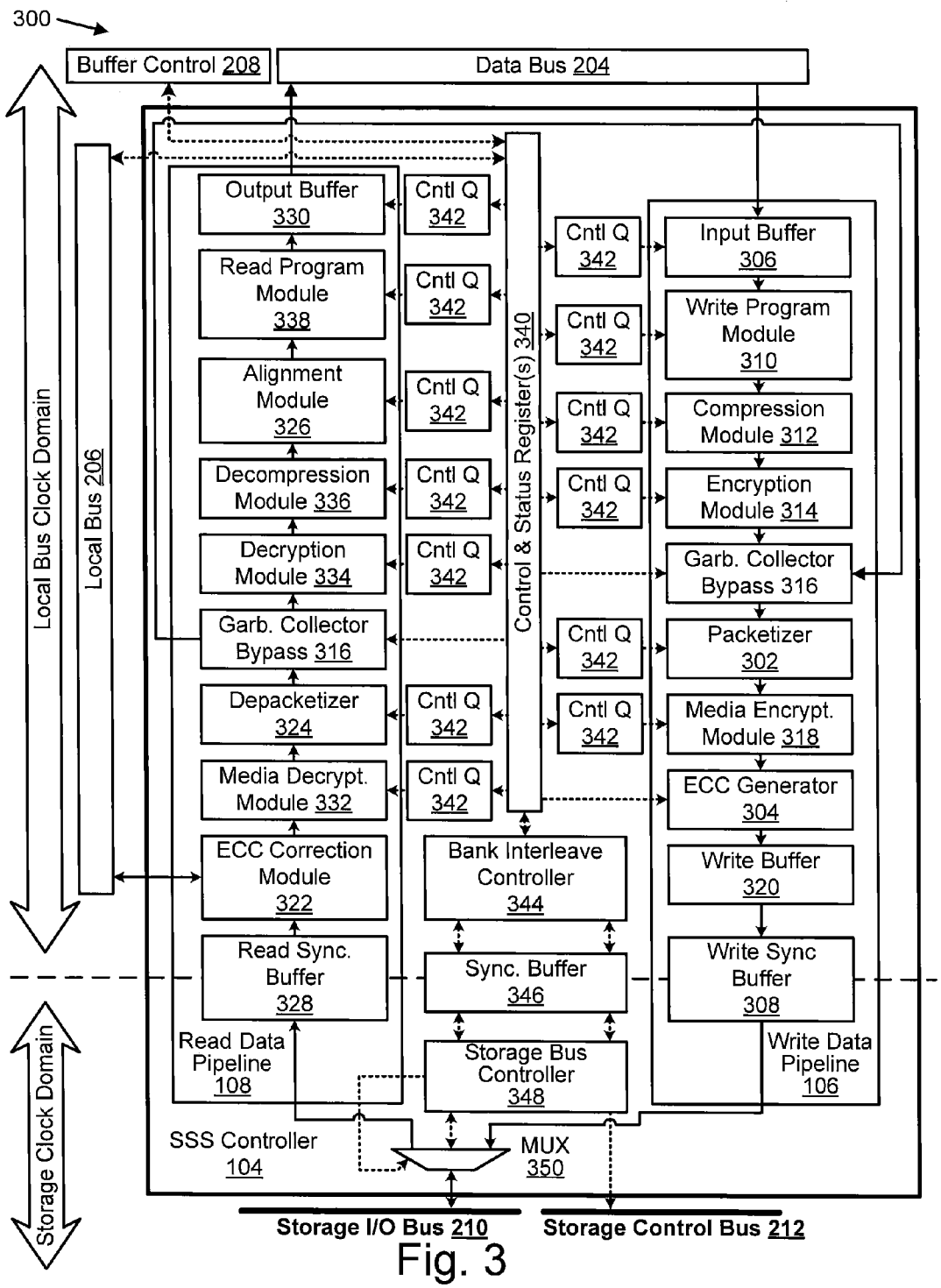
FIG. 3 is a schematic block diagram illustrating one embodiment of a solid-state storage controller with a write data pipeline and a read data pipeline in a data storage device.

FIG. 3 is a schematic block diagram illustrating one embodiment 300 of a solid-state storage controller 104 with a write data pipeline 106, a read data pipeline 108 and a throughput management apparatus 122 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the solid-state storage device 102 in data segments streamed to the solid-state storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error-correcting algorithm to generate ECC check bits, which are stored with the one or more data packets.

The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically, when the write data pipeline 106 does not include an input buffer 306, a buffering function is performed elsewhere, such as in the solid-state storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synchronization buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the solid-state storage controller 104 from one of a solid-state storage device 102, host computing system 114, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102, if the solid-state storage media 110 is connected to a different solid-state storage controller 104, solid-state storage device 102, or host computing system 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that computing systems 114 or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the logical page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one logical page in the solid-state storage media 110. This allows a write operation to send an entire logical page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full logical page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the solid-state storage media 110.

In another embodiment, the write buffer 320 is sized smaller than a logical page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a logical page prior to programming the data. In this way, a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or minor copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically, the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4A:
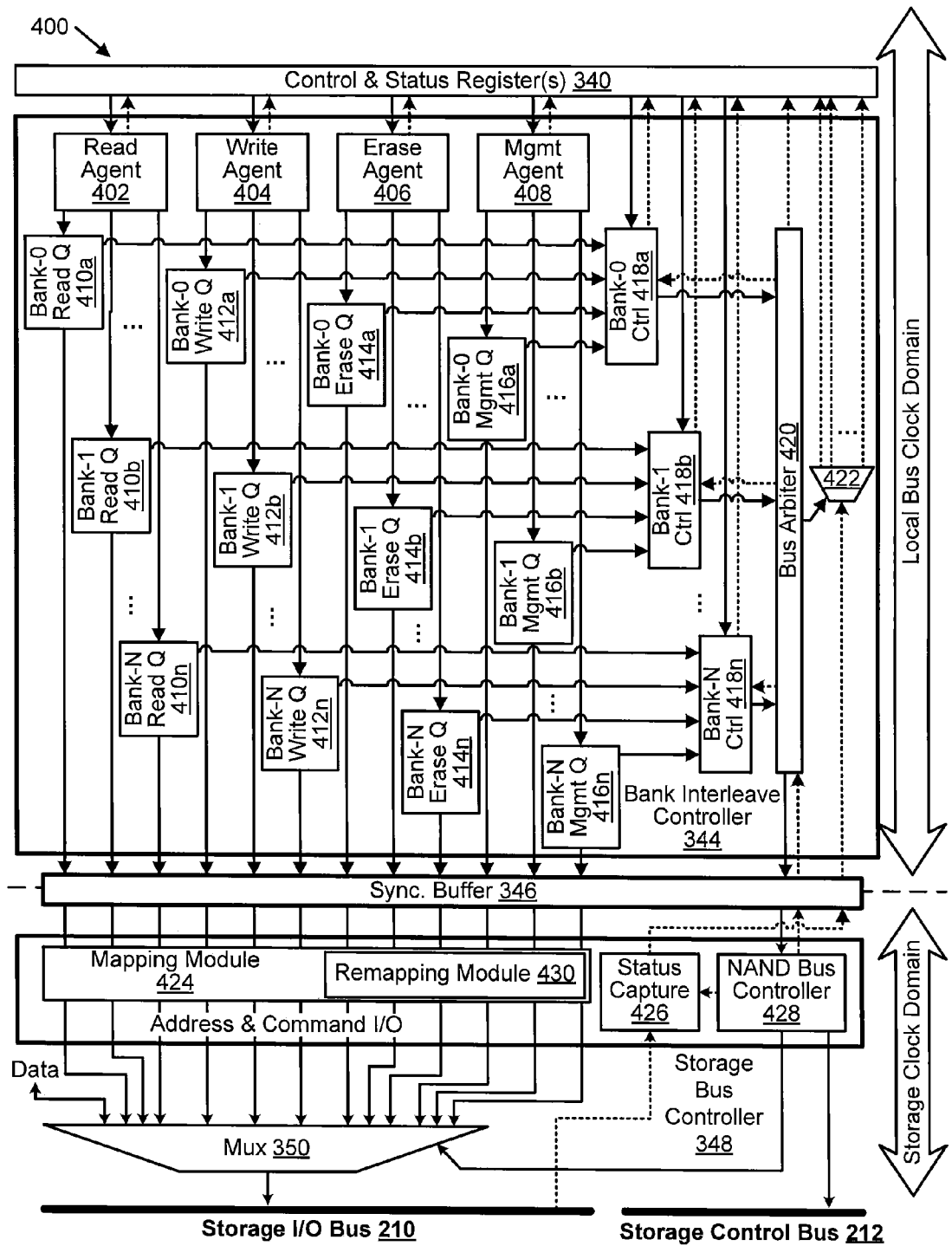
FIG. 4A is a schematic block diagram illustrating one embodiment of a bank interleave controller in a solid-state storage controller.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4A. The throughput management apparatus 122 is coupled to the bank interleave controller 344 and storage bus controller 348, in certain embodiments. The throughput management apparatus 122 is described in relation to FIG. 4A.

Bank Interleave

FIG. 4A is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 304 and coordinates among the banks 214 of the solid-state storage media 110 execution of the commands stored in the queues, such that a command of a first type executes on one bank 214a while a command of a second type executes on a second bank 214b. In one embodiment, the one or more commands may be separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read commands, discard/TRIM commands, and write commands and queues 410, 412 (e.g., I/O operations), but may also include other commands and queues that are storage media specific. For example, in the embodiment depicted in FIG. 4A, erase and management queues 414, 416 are included and would be appropriate for flash memory, NRAM, MRAM, DRAM, PRAM, etc. In other words, while an erase command is a type of storage device management operation, the interleave controller 344 may include a separate erase queue 414 for such commands. In other embodiments, discard/TRIM, erase, and other similar commands are other examples of storage device management operations. In certain embodiments, the interleave controller 344 uses one of a variety of scheduling algorithms to ensure that the scarce resource (access to a bank) is most efficiently scheduled.

For other types of solid-state storage media 110, other types of commands and corresponding queues may be included without straying from the scope of the invention. The flexible nature of an FPGA solid-state storage controller 104 allows flexibility in what type of storage media is used. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4A, the bank interleave controller 344 includes, for each bank 214, a read queue 410 for commands to read data from the solid-state storage media 110, a write queue 412 for write commands to the solid-state storage media 110, an erase queue 414 for commands to erase an erase block in the solid-state storage, and a management queue 416 for management operations. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management operations, status requests, and the like, such as a reset command or a request to read a configuration register of a bank 214, such as bank-0 214a. The management agent 408 sends the management operation to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

In one embodiment, the bank interleave controller 344 may coordinate with the agents 402, 404, 406, 408 to monitor storage requests received by the control and status registers 340. In certain embodiments, the bank interleave controller 344 may monitor storage requests to identify the storage requests and determine whether the ordering of the storage request in the queues 410, 412, 414, 416 satisfy an operation order criteria. An operation order criteria is criteria for controlling the order of operation execution within the solid-state storage controller 104. In one embodiment, the order of operation execution may be managed by the bank interleave controller 344.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. In certain embodiments, the subcommands comprise multi-phase commands. Additionally, in conjunction with example write command, the storage bus controller 348 will cause the one or more commands to be multiplied to each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. As described above, the bus arbiter 420 cooperates with the bank interleave controller 344 such that the desired operation execution order is accomplished. Of course re-adjusting execution order may be performed by ordering operations in a bank queue 418 or defining an order or prioritization for how the bus arbiter 420 selects the operations from a bank queue 418. In another embodiment, the bus arbiter 420 may respond to a high-level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management operations, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418*a* which may have a write command or a series of write sub-commands on the top of its queue, which cause the storage bus controller 348 to execute the following sequence. The bus arbiter 420 forwards the write command to the storage bus controller 348, which sets up a write command by selecting bank-0 214*a* through the storage control bus 212, sending a command to clear the input buffers of the solid-state storage elements 110 associated with the bank-0 214*a*, and sending a command to validate the status of the solid-state storage elements 216, 218, 220 associated with the bank-0 214*a*. The storage bus controller 348 then transmits a write subcommand on the storage I/O bus 210, which contains the physical addresses including the address of the logical erase block for each individual physical erase block of solid-stage storage element 216*a-m* as mapped from the logical erase block address. The storage bus controller 348 then multiplexes the write buffer 320 through the write synchronization buffer 308 to the storage I/O bus 210 through the MUX 350 and streams write data to the appropriate page. When the page is full, then storage bus controller 348 causes the solid-state storage elements 216*a-m* associated with the bank-0 214*a* to program the input buffer to the memory cells within the solid-state storage elements 216*a-m*. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214*a*, other subcommands of other commands are executing on other banks 214*b-n*. When one command is fully executed on a bank 214*a*, the bus arbiter 420 directs another command to the bank 214*a*. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a logical erase block of a bank 214*a*. While Bank 0 214*a* is executing an erase command, the bus arbiter 420 may select other commands for execution on the other banks 214*b-n*. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

Figure 4B:
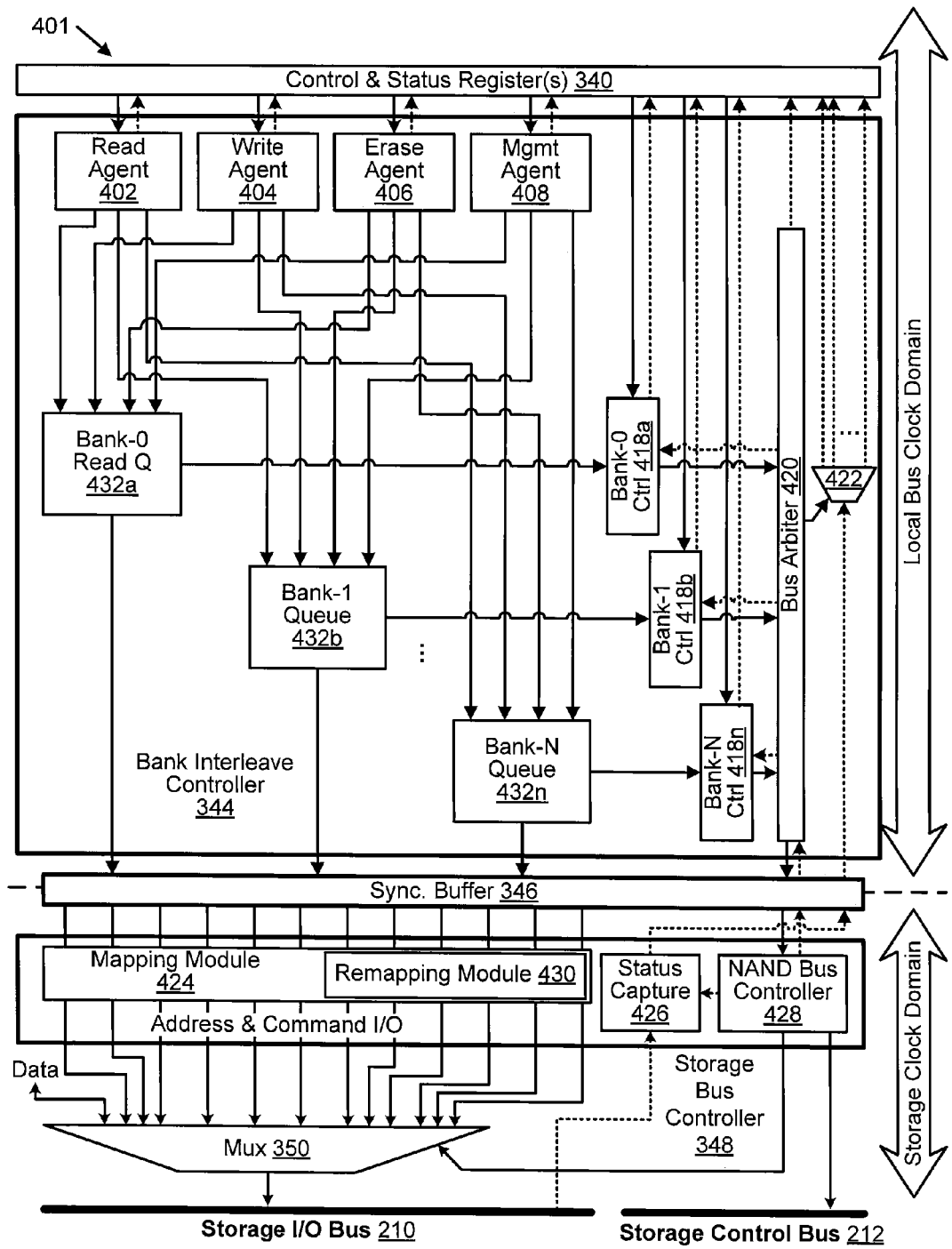
FIG. 4B is a schematic block diagram illustrating an alternate embodiment of a bank interleave controller in the solid-state storage controller in accordance with the present invention.

FIG. 4B is a schematic block diagram illustrating an alternate embodiment 401 of a bank interleave controller in the solid-state storage controller in accordance with the present invention. The components 210, 212, 340, 346, 348, 350, 402-430 depicted in the embodiment shown in FIG. 4B are substantially similar to the bank interleave apparatus 400 described in relation to FIG. 4A except that each bank 214 includes a single queue 432*a-n* and the read commands, write commands, erase commands, management operations, etc. for a bank (e.g., Bank-0 214*a*) are directed to a single queue 432*a* for the bank 214*a*. The queues 432, in one embodiment, are FIFO. In another embodiment, the queues 432 can have commands pulled from the queues 432 in an order other than the order they were stored. In another alternate embodiment (not shown), the read agent 402, write agent 404, erase agent 406, and management agent 408 may be combined into a single agent assigning commands to the appropriate queues 432*a-n*.

In another alternate embodiment (not shown), commands are stored in a single queue where the commands may be pulled from the queue in an order other than how they are stored so that the bank interleave controller 344 can execute a command on one bank 214*a* while other commands are executing on the remaining banks 214*b-n*. One of skill in the art will easily recognize other queue configurations and types to enable execution of a command on one bank 214*a* while other commands are executing on other banks 214*b-n*.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216*a-m*, 218*a-m*, 220*a-m*. For example, one bank interleave controller 344 serves one column of storage elements SSS 0.0-SSS N.0 216*a*, 218*a*, . . . 220*a*, a second bank interleave controller 344 serves a second column of storage elements SSS 0.1-SSS N.1 216*b*, 218*b*, . . . 220*b* etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage media 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each column of solid-state storage elements (e.g., SSS 0.0 216a, SSS 1.0 218a, SSS N.0 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0.x to SSS N.x 216, 218, 220) to the MUX 350 for each column of solid-state storage elements (SSS 0.x to SSS N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g., SSS 0.0 to SSS 0.M 216) per bank 214a may have a logical address for a particular logical erase block mapped to twenty physical addresses of twenty physical erase blocks, one physical address per storage element. Because the storage elements are accessed in parallel, erase blocks at the same position in each storage element in a column of storage elements 216a, 218a, 220a will have the same physical address. To select one erase block (e.g., in storage element SSS 0.0 216a) instead of all erase blocks in the column (e.g., in storage elements SSS 0.0, SSS 1.0, . . . SSS N.0 216a, 218a, 220a), one bank (in this case Bank 0 214a) is selected.

This logical-to-physical mapping for erase blocks is beneficial because if one physical erase block becomes damaged or inaccessible, the mapping can be changed so that the logical erase block maps to another physical erase block instead of the damaged physical erase block. This mitigates the impact of losing an entire logical erase block when one element's physical erase block is faulty. The remapping module 430 changes a mapping of a logical address of a logical erase block to one or more physical addresses of a physical erase blocks making up the logical erase block (the physical erase blocks being spread over the array of storage elements). A logical erase block may be mapped to a set of physical erase blocks in a single bank. For example, logical erase block 1 may be mapped to physical erase block 1 of storage element SSS 0.0 216a, to physical erase block 1 of storage element SSS 0.1 216b, . . . , and to physical erase block 1 of storage element SSS 0.M 216m; logical erase block 2 may be mapped to physical erase block 2 of storage element SSS 1.0 218a, to physical erase block 2 of storage element SSS 1.1 218b, . . . , and to logical erase block 2 of storage element 1.M 218m, etc. Alternatively, a logical erase block may be mapped to a set of physical erase blocks located in multiple banks. For example, logical erase block 1 may be mapped to one physical erase block from each storage element in an array such that logical erase block 1 includes physical erase blocks from Bank 0 214a (e.g., physical erase block 1 of storage element SSS 0.0 216a, physical erase block 1 of storage element SSS 0.1 216b, . . . , and physical erase block 1 of storage element 0.M 216m), physical erase blocks from Bank 1 214b (e.g., physical erase block 1 of storage element SSS 1.0 218a, physical erase block 1 of storage element SSS 1.1 218b, . . . , and physical erase block 1 of storage element 1.M 218m), and so on up to physical erase blocks from Bank N 214n, which may include, for example erase block 1 of storage element N.M 220m.

If, for example, erase block 1 of storage element SSS 0.0 216a is damaged, experiencing errors due to wear, etc., or cannot be used for some reason, the remapping module 430 could change the logical-to-physical mapping for the logical address of logical erase block 1 that pointed to physical erase block 1. If a spare physical erase block (call it erase block 221) of storage element SSS 0.0 216a is available and currently not mapped, the remapping module 430 could change the mapping of logical erase block 1 to point to physical erase block 221 of storage element SSS 0.0 216a, while continuing to point to physical erase block 1 of storage element SSS 0.1 216b, physical erase block 1 of storage element SSS 0.2 216c (not shown) . . . , and physical erase block 1 of storage element M.0 216m. The mapping module 424 or remapping module 430 could map erase blocks in a prescribed order (e.g., logical erase block 1 to physical erase block 1 of the storage elements, logical erase block 2 to physical erase block 2 of the storage elements, etc.) or may map physical erase blocks of the storage elements 216, 218, 220 in another order based on some other criteria.

In one embodiment, the physical erase blocks could be grouped into a logical erase block by access time. Grouping by access time, meaning time to execute a command, such as programming (writing) data into pages of specific physical erase blocks, can level command completion so that a command executed across the physical erase blocks of a logical erase block is not limited by the slowest physical erase block. In other embodiments, the physical erase blocks may be grouped into a logical erase block by wear level, health, etc. One of skill in the art will recognize other factors to consider when mapping or remapping physical erase blocks into logical erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Figure 5:
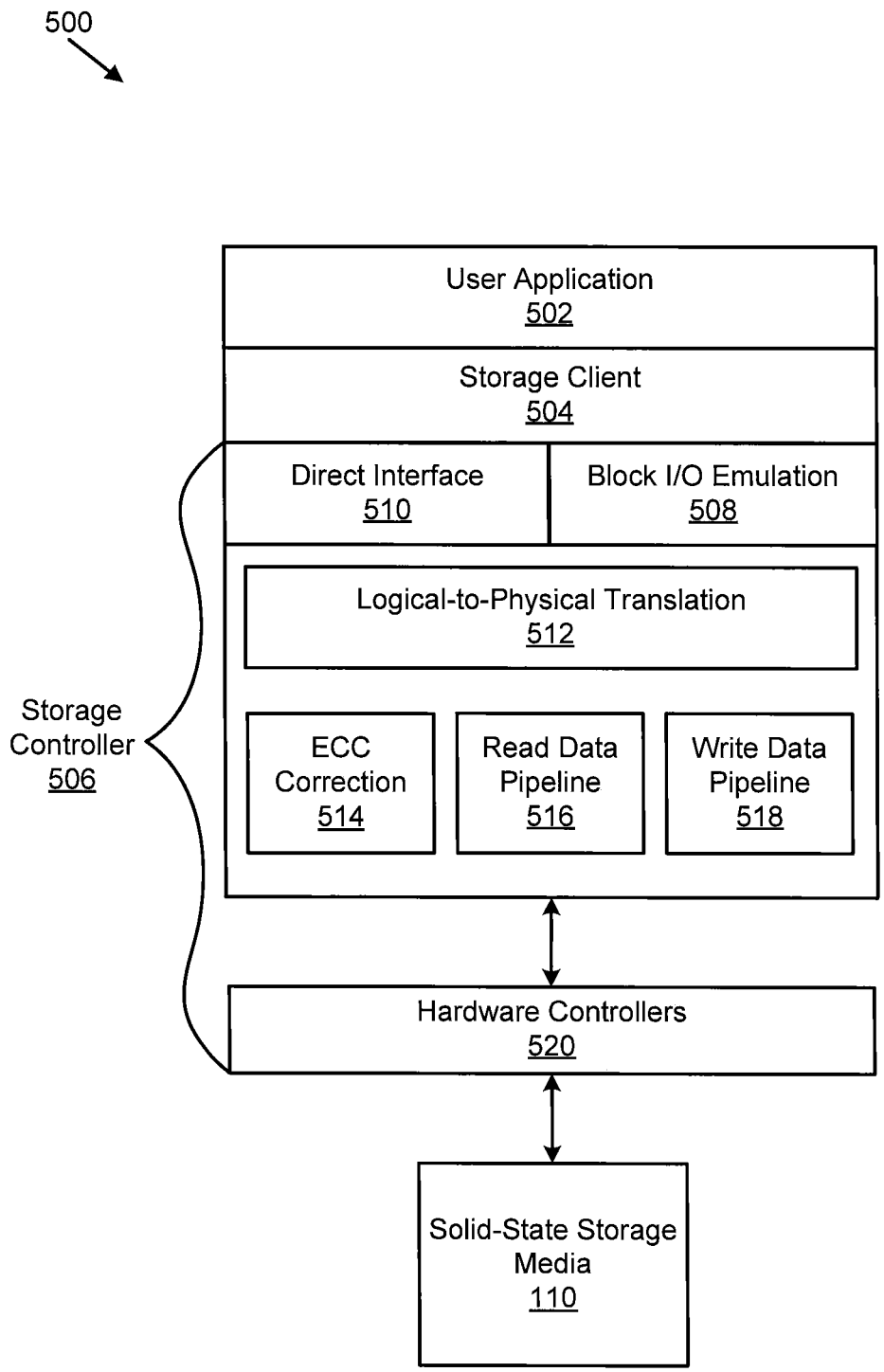
FIG. 5 is a schematic block diagram illustrating one embodiment of a logical representation of a solid-state storage controller with a logical-to-physical translation layer in accordance with the present invention.

FIG. 5 is a schematic block diagram illustrating a logical representation 500 of a solid-state storage controller 506 with a logical-to-physical translation layer 512 in accordance with the present invention. The storage controller 506 may be similar, in certain embodiments, to the solid-state storage controller 104 depicted in FIG. 1 and may include one or more solid-state storage controllers 104. The depicted embodiment shows a user application 502 in communication with a storage client 504. The storage client 504 is in communication with a storage controller 506 that includes the logical-to-physical translation layer 512, an ECC correction module 514, a read data pipeline 516, and a write data pipeline 518.

The storage controller 506 manages solid-state storage media 110. The storage controller 506 may include various hardware and software controllers, drivers, and software, such as the depicted hardware controllers 520.

In one embodiment, the depicted hardware controllers 520 may be substantially similar to and include similar functionality as the solid-state controllers 104 and accompanying controllers and modules depicted in FIGS. 1 and 2 and/or the bank interleave controller 344 and storage bus controller 348 depicted in FIGS. 3, 4A, and 4B. Furthermore, the ECC correction module 514 may be substantially similar and include similar functionality to the ECC correction module 322 and/or the ECC generator 304 depicted in FIG. 3. In addition, the read data pipeline 516 and the write data pipeline 518 may be substantially similar to the read data pipeline 108 and the write data pipeline 106 depicted in FIG. 3. The solid-state storage array may include an array of solid-state storage banks similar to the solid-state storage media 110 and corresponding solid-state storage banks 214 depicted in FIG. 2.

In one embodiment, the user application 502 is a software application operating on or in conjunction with the storage client 504. The storage client 504 manages files and data and utilizes the functions and features of the storage controller 506 and associated solid-state storage array. Representative examples of storage clients include, but are not limited to, a server, a file system, an operating system, a database management system ("DBMS"), a volume manager, and the like. The storage client 504 is in communication with the storage controller 506. In one embodiment, the storage client 504 communicates through an Input/Output (I/O) interface represented by a block I/O emulation layer 508.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, certain storage devices 102 do not directly or necessarily associate logical block addresses with particular physical blocks. These storage devices 102 may emulate a conventional block storage interface to maintain compatibility with block storage clients 504.

When the storage client 504 communicates through the block I/O emulation layer 508, the storage device 102 appears to the storage client 504 as a conventional block storage device. In one embodiment, the storage controller 506 provides a block I/O emulation layer 508, which serves as a block device interface, or API. In this embodiment, the storage client 504 communicates with the storage device 102 through this block device interface. In one embodiment, the block I/O emulation layer 508 receives commands and logical block addresses from the storage client 504 in accordance with this block device interface. As a result, the block I/O emulation layer 508 provides the storage device 102 compatibility with block storage clients 504.

In one embodiment, a storage client 504 communicates with the storage controller 506 through a direct interface layer 510. In this embodiment, the storage device 102 directly exchanges information specific to non-volatile storage devices. A storage device 102 using direct interface 510 may store data on the solid-state storage media 110 as blocks, sectors, pages, logical blocks, logical pages, erase blocks, logical erase blocks, ECC chunks, logical ECC chunks, or in any other format or structure advantageous to the technical characteristics of the solid-state storage media 110. The storage controller 506 receives a logical address and a command from the storage client 504 and performs the corresponding operation in relation to the non-volatile solid-state storage media 110. The storage controller 506 may support a block I/O emulation layer 508, a direct interface 510, or both a block I/O emulation layer 508 and a direct interface 510.

As described above, certain storage devices, while appearing to a storage client 504 to be a block storage device, do not directly associate particular logical block addresses with particular physical blocks, also referred to in the art as sectors. Such storage devices may use a logical-to-physical translation layer 512. The logical-to-physical translation layer 512 provides a level of abstraction between the logical block addresses used by the storage client 504, and the physical block addresses at which the storage controller 506 stores the data. The logical-to-physical translation layer 512 maps logical block addresses to physical block addresses of data stored on solid-state storage media 110. This mapping allows data to be referenced in a logical address space using logical identifiers, such as a logical block address. A logical identifier does not indicate the physical location of data on the solid-state storage media 110, but is an abstract reference to the data.

The storage controller 506 manages the physical block addresses in the physical address space. In one example, contiguous logical block addresses may in fact be stored in non-contiguous physical block addresses as the logical-to-physical translation layer 512 determines the location on the solid-state storage media 110 to perform data operations.

Furthermore, in one embodiment, the logical address space is substantially larger than the physical address space. This "thinly provisioned" or "sparse address space" embodiment, allows the number of logical identifiers for data references to greatly exceed the number of possible physical addresses. Specifically, the logical address space may be "sparse" and, as such, may comprise a logical capacity that exceeds the physical storage capacity of the solid-state storage media 110. Accordingly, the logical address space may be defined independent of the solid-state storage media 110; the logical address space may present a larger address space than the physical storage capacity of the solid-state storage media 110, may present different storage location partitions and/or block sizes than provided by the solid-state storage media 110, and so on.

The storage controller 506 may support a sparse address space by writing data using a log-based, append only writing structure. Specifically, the storage controller 506, in one embodiment, writes data of a write request to physical storage media of the solid-state storage media 110 at one or more logical addresses of the physical storage media corresponding to the addresses of the write request as mapped by the logical-to-physical translation layer 512. In a further embodiment, the storage controller 506 writes the data of the write request by appending the data to a sequential, log-based writing structure of the physical storage media of the solid-state storage media 110 at an append point. The storage controller 506, in one embodiment, returns one or more physical addresses corresponding to the append point and the logical-to-physical translation layer 512 maps the one or more logical addresses to the one or more physical addresses corresponding to the append point.

As the storage controller 506 clears, trims, replaces, expires, and/or evicts, data from the physical addresses and associated physical storage media, the solid-state storage media 110 in the depicted embodiment, are freed to store data for other logical addresses. In one embodiment, the storage controller 506 stores data at the physical addresses using a log-based, append only writing structure such that data overwritten by a subsequent write request invalidates other data in the log. Consequently, a garbage collection process recovers the physical capacity of the invalid data in the log. One embodiment of the log-based, append only writing structure is a logically ring-like data structure, as new data is appended to the log-based writing structure, previously used physical capacity is reused in a circular, theoretically infinite manner.

In one embodiment, the logical-to-physical translation layer 512 includes a map or index, a "forward map," that maps logical block addresses to physical block addresses. Often logical addresses used to identify stored data represent a very small number of logical addresses that are possible within a name space or range of possible logical addresses. Searching this sparsely populated space may be cumbersome. For this reason, the forward map is typically a data structure that facilitates quickly traversing the forward map to find a physical address based on a logical address. For example, the forward map may include a B-tree, a content addressable memory ("CAM"), a binary tree, a hash table, or other data structure that facilitates quickly searching a sparsely populated space or range. By using a forward map that quickly searches a sparsely populated logical namespace or address space, the logical-to-physical translation layer 512 provides an efficient way to determine one or more physical addresses from a logical address. In certain embodiments, the logical-to-physical translation layer 512 is a tree with nodes that represent logical block addresses and comprise corresponding physical block addresses.

In one embodiment, the forward map binds, in a logical-to-physical map, bound LBAs to physical storage locations. The storage controller 506 may determine if the logical space has sufficient unallocated logical space using the logical-to-physical map. The logical-to-physical map may be used to track allocation of bound LBAs, unbound LBAs, allocated LBAs, unallocated LBAs, allocated LBA capacity, unallocated LBA capacity, and the like. In one embodiment, the forward map binds LBAs to corresponding physical storage location addresses in multiple maps.

The forward map, the sparse logical address space, and the log-based writing are described in further detail in U.S. patent application Ser. No. 12/986,117 entitled "Apparatus, System, and Method for a Virtual Storage Layer" filed 6 Jan. 2011, for David Flynn et al., and U.S. Provisional Patent Application Ser. No. 61/373,271 entitled "Apparatus, System, and Method for Caching Data" filed 12 Aug. 2010, for David Flynn, which are hereby incorporated by reference.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 with a logical-to-physical translation layer 512 (a storage controller 104 that does not map a logical block address directly to a particular physical block), deletes a logical block address, the corresponding physical block address remains allocated because the storage client 504 does not communicate the change in used blocks to the storage controller 506. The storage client 504 may not be configured to communicate changes in used blocks (also referred to herein as "data block usage information"). Because the storage client 504 uses the block I/O emulation 508 layer, the storage client 504 may erroneously believe that the storage controller 506 is a conventional storage controller that would not utilize the data block usage information. Or, in certain embodiments, other software layers between the storage client 504 and the storage controller 506 may fail to pass on data block usage information.

Consequently, the storage controller 104 preserves the relationship between the logical block address and a physical address and the data on the storage device 102 corresponding to the physical block. As the number of allocated blocks increases, the performance of the storage controller 104 may suffer depending on the configuration of the storage controller 104.

Specifically, in certain embodiments, the storage controller 506 is configured to store data sequentially, using an append-only writing process, and use a storage space recovery process that re-uses non-volatile storage media storing deallocated/unused logical blocks. Specifically, as described above, the storage controller 506 may sequentially write data on the solid-state storage media 110 in a log structured format and within one or more physical structures of the storage elements, the data is sequentially stored on the solid-state storage media 110.

As a result of storing data sequentially and using an append-only writing process, the storage controller 506 achieves a high write throughput and a high number of I/O operations per second ("IOPS"). The storage controller 506 includes a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 512.

As described above, the storage space recovery process determines that a particular section of storage may be recovered. Once a section of storage has been marked for recovery, the storage controller 506 may relocate valid blocks in the section. The storage space recovery process, when relocating valid blocks, copies the packets and writes them to another location so that the particular section of storage may be reused as available storage space, typically after an erase operation on the particular section. The storage controller 506 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices 102 are configured to receive messages or commands notifying the storage device 102 of these unused logical blocks so that the storage device 102 may deallocate the corresponding physical blocks. As used herein, to deallocate a physical block includes marking the physical block as invalid, unused, or otherwise designating the physical block as available for storage space recovery, its contents on storage media no longer needing to be preserved by the storage controller 506. Data block usage information, in reference to the storage controller 506, may also refer to information maintained by the storage controller 506 regarding which physical blocks are allocated and/or deallocated/unallocated and changes in the allocation of physical blocks and/or logical-to-physical block mapping information. Data block usage information, in reference to the storage controller 506, may also refer to information maintained by the storage controller 506 regarding which blocks are in use and which blocks are not in use by a storage client. Use of a block may include storing of data in the block on behalf of the client, reserving the block for use by a client, and the like.

While physical blocks may be deallocated, in certain embodiments, the storage controller 506 may not immediately erase the data on the storage media. An erase operation may be performed later in time. In certain embodiments, the data in a deallocated physical block may be marked as unavailable by the storage controller 506 such that subsequent requests for data in the physical block return a null result or an empty set of data.

One example of a command or message for such deallocation is the "Trim" function of the "Data Set Management" command under the T13 technical committee command set specification maintained by INCITS. A storage device, upon receiving a Trim command, may deallocate physical blocks for logical blocks whose data is no longer needed by the storage client 504. A storage controller 506 that deallocates physical blocks may achieve better performance and increased storage space, especially storage controllers 506 that write data using certain processes and/or use a similar data storage recovery process as that described above.

Consequently, the performance of the storage controller 506 is enhanced as physical blocks are deallocated when they are no longer needed such as through the Trim command or other similar deallocation commands issued to the storage controller 506.

Figure 6:
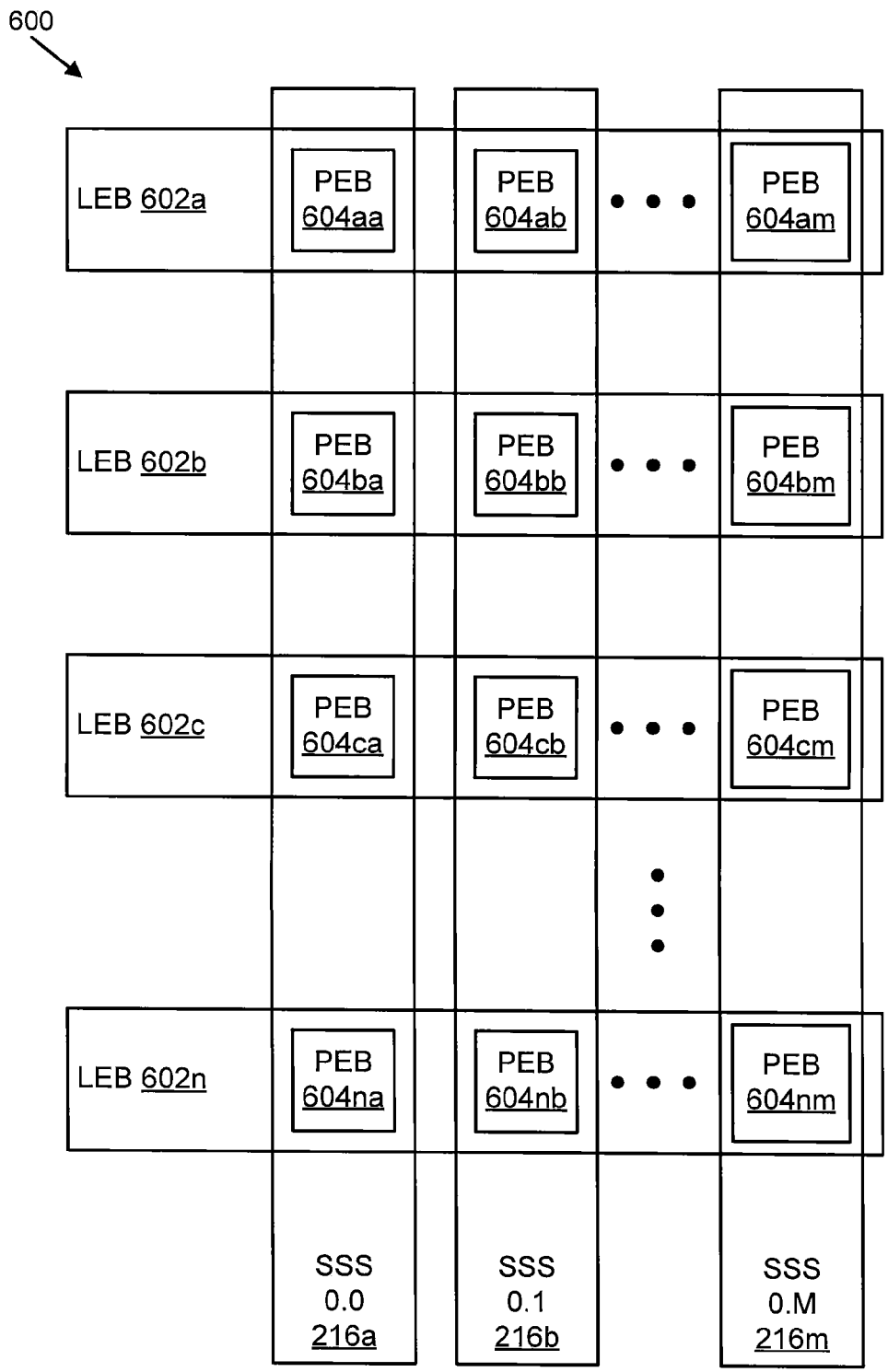
FIG. 6 is a schematic block diagram illustrating relationships between physical erase blocks, logical erase blocks, and solid-state storage elements in accordance with the present invention.

As was discussed above, physical erase blocks of solid-state storage 110 may be arranged in logical erase blocks. FIG. 6 illustrates one arrangement 600 of physical erase blocks 604 into logical erase blocks 602. According to the arrangement, each logical erase block 602 includes one physical erase block 604 from each of solid-state storage elements 216a through 216m. For example, logical erase block 602a includes physical erase blocks 604aa of SSS 216a, 604ab of SSS 216b, and 604am of SSS 216m. In one embodiment, storage controller 104 writes data to solid-state storage media 110 in logical pages wherein each logical page is written to a logical erase block such that a portion of each logical page is written to each of the physical erase blocks of the logical erase block. For example, when writing a logical page to logical erase block 602a, some of the logical page will be written to physical erase block 604aa, some of the logical page will be written to physical erase block 604ab, and so on.

Figure 7:
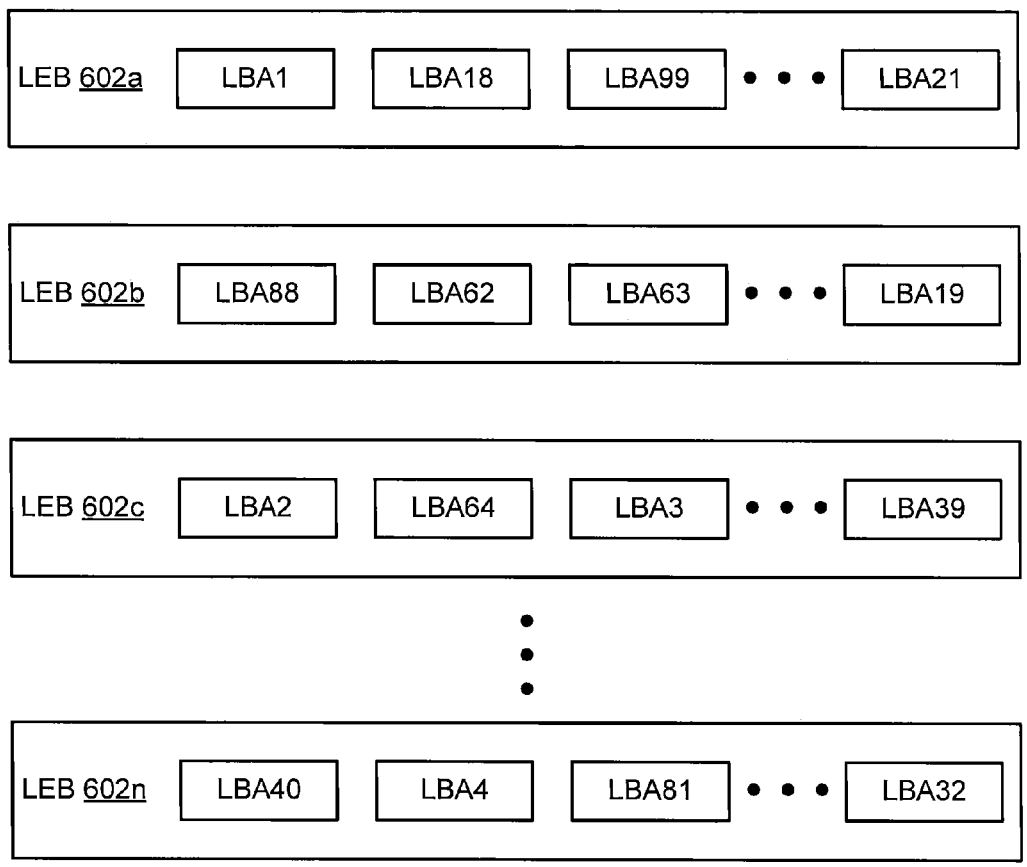
FIG. 7 is a schematic block diagram illustrating relationships between logical block addresses and logical erase blocks in accordance with the present invention.

A method of mapping logical block addresses used by a user application 502 to physical addresses of solid-state storage media 110 was discussed above. FIG. 7 illustrates one example mapping of logical block addresses (LBAs) to logical erase blocks. As was discussed above, storage controller 104 need not store data of contiguous logical block addresses in contiguous physical locations of solid-state storage 110. For example, as illustrated in FIG. 7, logical erase block 602a may store LBA1 while logical erase block 602c may store LBA2 and LBA3.

Returning now to the discussion of backing up data stored by solid-state storage 110 in backing store 120, backing store 120 may be one or more devices that store data in a nonvolatile manner. For example, backing store 120 may include one or more disk drives, tape drives, storage area networks, or other nonvolatile storage devices. Backing store 120 may connect with host computing system 114 via a system bus, external bus, and/or network connection. Backing store 120 may be sized such that it has at least the same capacity as a solid-state storage media 110. As a result, all of the user data stored by solid-state storage media 110 may be copied to backing store 120.

Referring to FIG. 1, operations module 130 may execute storage operations on solid-state storage 110. For example, operations module 130 may execute write operations that write data to solid-state storage media 110. In one embodiment, operations module 130 may execute the write operations in response to receiving user data from user application 502. Operations module 130 may use write data pipeline 106 to execute the write operations.

Similarly, operations module 130 may execute read operations that read data from solid-state storage media 110. In one embodiment, operations module 130 may execute the read operations in response to receiving a request for data stored by solid-state storage media 110 from user application 502. Operations module 130 may use read data pipeline 108 to execute the read operations.

As was discussed above, although solid-state storage media 110 may generally be described as being nonvolatile, some embodiments of solid-state storage media 110 might not retain data indefinitely. For example, data stored by embodiments of solid-state storage media 110 using NAND flash technology may be errored if the data is not rewritten within a data retention time interval because electric charge that represents the data and that is stored on floating gates of solid-state storage media 110 may dissipate. Such errors are referred to herein as retention errors.

To prevent data loss due to retention errors, backup module 134 may copy data stored by solid-state storage media 110 to backing store 120. Storage controller 104 may rely on the copied data in backing store 120 if retention errors corrupt corresponding data stored by solid-state storage media 110. In one embodiment, backup module 134 may track which portions of the data stored on solid-state storage media 110 are currently backed in backing store 120. In one embodiment, the forward map (also known as the index) of the logical-to-physical translation layer 512 of FIG. 5 may be used to track which portions of the data stored on solid-state storage media 110 are currently backed up in backing store 120. Backup module 134 may use operations module 130 in writing data to and reading data from solid-state storage media 110.

If backup module 134 maintains a copy all data stored by solid-state storage media 110 to backing store 120, storage controller 104 can recover from any corruption, due to data retention, of data stored by solid-state storage media 110. However, copying all of the data stored by solid-state storage media 110 may consume a great deal of time and significantly impact the ability of storage device 102 to accept and store new user data in solid-state storage media 110 at an acceptable rate.

Using the methods described herein, storage controller 104 may minimize data retention errors without keeping the entire contents of solid-state storage media 110 backed up to the backing store 120 substantially all of the time. Doing so helps to minimize any degradation (e.g., delay) in reading and/or writing user data to solid-state storage media 110. In some instances, however, it may be more efficient to write data to both solid-state storage media 110 and backing store 120 simultaneously or within a short period of each other. In particular, this dual write approach may be useful for data that is not likely to change.

One such method includes age module 132 determining, for each portion of user data stored on the solid-state storage media 110 (e.g., each logical block address), an amount of time that has expired since the data portion was most recently written to solid-state storage media 110. This length of time is referred to herein as the age of the data portion. For data portions not already backed in backing store 120, age module 132 may determine which of the data portions stored by solid-state storage media 110 are approaching the data retention time interval of solid-state storage 110 (the age at which errors are likely to occur) by comparing ages of the data to a data retention time threshold. The data retention time threshold may involve a threshold age and an operator. For example, the data retention time threshold may be satisfied by an age greater than or equal to 90 days. Note that the data retention time interval is an estimate of the age at which retention errors will occur. Accordingly, some memory cells of solid-state storage media 110 may experience retention errors prior to the data retention time interval. To provide a buffer against such instances, the data retention time threshold may be selected to be less than the data retention time interval to provide some margin between the two.

Age module 132 may identify data portions having ages that satisfy the data retention time threshold and backup module 134 may copy the identified data portions to backing store 120 prior to the ages of the identified data portions reaching the data retention time interval.

Figure 8:
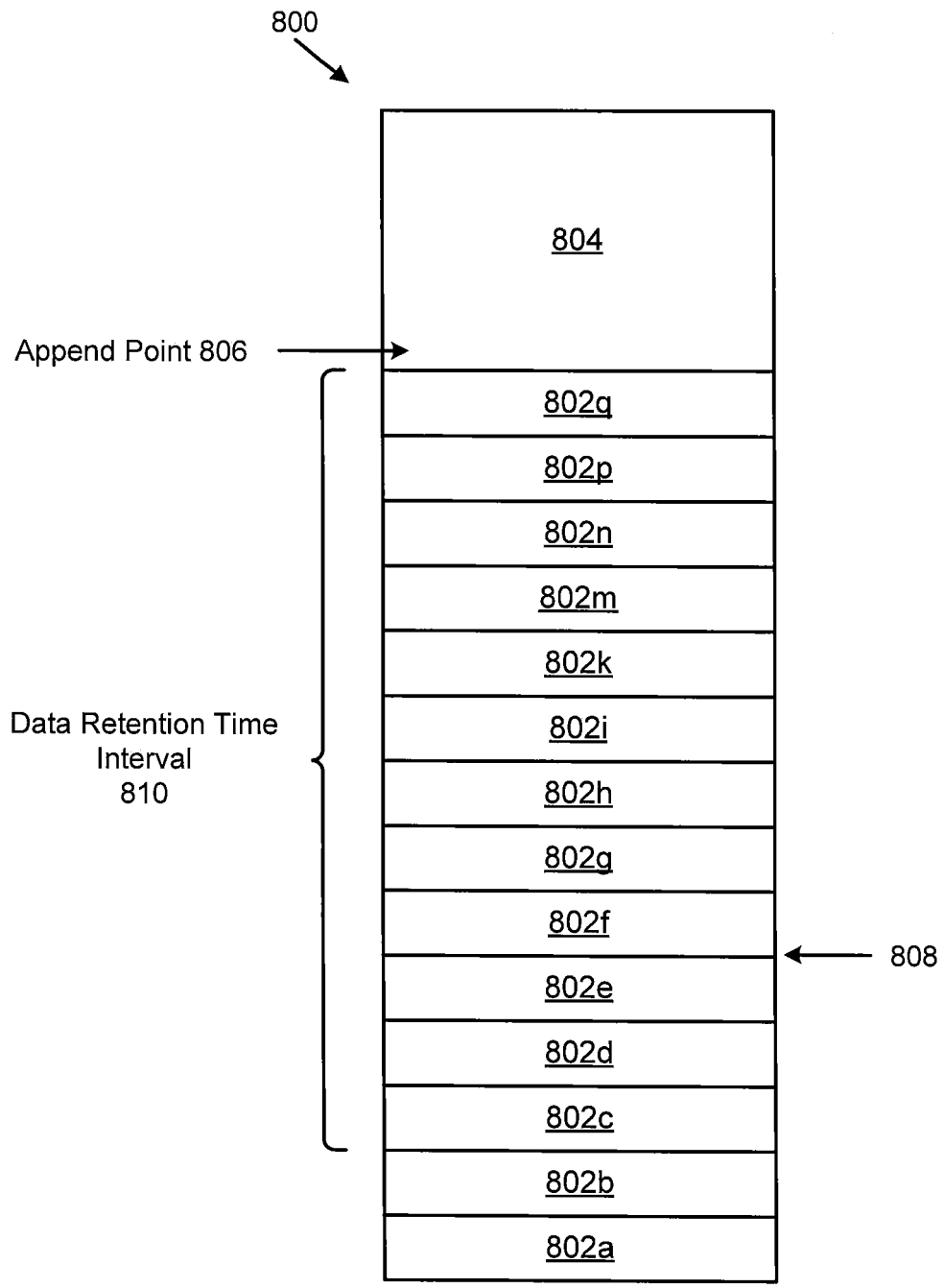
FIG. 8 is a schematic block diagram illustrating a log structure in accordance with the present invention.

FIG. 8 illustrates a schematic block diagram of a log-based structure 800 of solid-state storage media 110. Log-based structure 800 includes portion 804 to which user data may be written. Portion 804 may include a plurality of logical erase blocks, each comprising a plurality of logical pages. Log-based structure 800 also includes portions 802 in which user data has already been written. In one embodiment, each portion 802 may be a different user data portion such as the portions described above. Portions 802 are written sequentially to log-based structure 800 starting with portion 802a and ending with portion 802q, which is the portion most recently written to log-based structure 800. Accordingly, portion 802a is older (has an older age) than all of the other portions 802.

Append point 806 is positioned in the next available logical page following portion 802q, the next available logical page being located within portion 804. The next data written to log-based structure 800 will be written to log 800 starting at append point 806.

Each of portions 802 has an age based on when the portion 802 was written to log 800. Log 800 has an associated data retention time interval 810. As illustrated in FIG. 8, some, but not all of portions 802 are within data retention time interval 810. Those portions within data retention time interval 810 have ages younger than or equal to data retention time interval 810. Note that portions 802a and 802b have ages older than data retention time interval 810.

Data retention time threshold 808 is also illustrated in FIG. 8. Portions 802a, 802b, 802c, 802d, and 802e each have ages older than data retention time threshold 808, while the other portions 802 have ages younger than data retention time threshold 808.

In relation to example log 800 of FIG. 8, in one embodiment, age module 132 may determine that portions 802a, 802b, 802c, 802d, and 802e satisfy data retention time threshold 808 because they are older than or equal to data retention time threshold 808. Next, backup module 134 may copy portions 802a, 802b, 802c, 802d, and 802e to backing store 120. In one embodiment, backup module 134 may copy these portions to backing store 120 in the following order 802a, 802b, 802c, 802d, 802e, to prevent data loss from any of these portions due to retention errors.

In some embodiments, log 800 may exhibit the following behaviors. If storage controller 104 temporarily stops appending data to log 800 or reduces the rate at which it appends data to log 800 (e.g., due to a lull in user activity), as time passes, more and more of the data portions of log 800 will have ages older than threshold 808 and as a result, threshold 808 will move toward append point 806. In addition, more data portions 802 will fall outside the data retention time interval 810. If storage controller 104 appends data to log 800 at a somewhat constant rate, threshold 808 will stay in approximately the same place in log 800 relative to append point 806. Similarly, approximately the same amount of data portions 802 will move outside the data retention time interval 810. If storage controller 104 accelerates the rate at which it appends data to log 800 (e.g., due to a burst write), threshold 808 will move toward the tail of log 800, away from append point 806. Consequently, if the writes are overwriting existing data on the solid-state storage media 110, the average age of the data on the log 800 will go down. However if the writes are new data the solid-state storage media 110 may fill up and portions may move outside the threshold 808 and/or data retention time interval 810 as time passes.

In one embodiment, storage controller 104 may use the following method. Operations module 130 executes storage operations that modify data previously stored on solid-state storage media 110. At some point after the modification of the data, backup module 134 copies the modified data to backing store 120. Note that backup module 134 need not immediately copy the modified data to backing store 120 since there will be very little risk that the modified data stored in solid-state storage media 110 will be corrupted by retention errors due to the young age of the modified data. Postponing the copying of the modified data may be advantageous since the copying may be postponed to a time during which the copying will not interrupt or will only slightly disturb the writing to or reading of user data. If the copying was not postponed, but instead performed immediately, the copying may noticeable decrease the performance of solid-state storage media 110 (e.g., by decreasing the rate at which data may be written to or read from solid-state storage 110). Accordingly, backup module 134 may wait to copy the modified data to backing store 120 until a time when copying the modified data will have little or no impact on the rate at which storage controller 104 writes other new user data to solid-state storage media 110. Such time is referred to herein as "slack time."

Slack time may also include periods during which no other storage operations (e.g., reads, writes) involving solid-state storage media 110 are pending. Storage controller 104 does ensure that backup module 134 copies the modified data to backing store 120 within the data retention time interval. In fact, in certain embodiments, when the age of the modified data satisfies the data retention time threshold, backup module 134 may copy the modified data to backing store 120 whether or not slack time is available.

Typically, the data retention time interval of solid-state storage media 110 is measured in weeks or months, not seconds or minutes. Accordingly, backup module 134 may have weeks or months to copy data from solid-state storage media 110 to backing store 120. Given this large amount of time, a backing store 120 having a relatively high latency or low throughput may be acceptable. For example, in a system in which backing store 120 is a tape drive, backup module 134 may still have adequate time to copy the data even though the tape drive may have a relatively high latency or low throughput as compared to other devices such as disk drives. Backing store 120 may comprise other types of devices, for example, off-site storage area networks or arrays of disk or tape drives.

In one embodiment, backup module 134 may determine a prioritized order in which to copy data from solid-state storage media 110 to backing store 120 so that when slack time becomes available, backup module 134 can immediately begin copying data to backing store 120 in a manner that prevents retention errors in the data stored by solid-state storage media 110. For example, backup module 134 may copy data having an age that satisfies the data retention time threshold prior to copying data having an age that does not satisfy the data retention time threshold.

Furthermore, backup module 134 may prioritize among data having an age that satisfies the data retention time threshold. For example, backup module 134 may copy a first subset of the data of solid-state storage media 110 prior to a second subset of the data where both the first subset and the second subset satisfy the data retention time threshold, but the first subset includes data that is modified less frequently than the data of the second subset. Doing so is advantageous if data of the second subset is modified (e.g., by a user) within solid-state storage media 110 prior to backup module 134 copying the second subset to backing store 120 because the modified data will most likely no longer satisfy the data retention time threshold due to its very young age.

Backup module 134 may additionally or alternatively prioritize among data having an age that satisfies the data retention time threshold by copying the data in sequential order based on logical block address. For example, backup module 134 may copy LBA1, LBA2, and LBA3 (illustrated in FIG. 7) to backing store 120 in that order (sequentially by logical block address) even though LBA1 is stored in a different logical erase block on solid-state storage media 110 than LBA2 and LBA3. Copying in sequential order according to logical block address may be advantageous with respect to backing store 120 if backing store 120 is configured to write sequential logical block addresses in adjacent physical locations. For example, when writing to a tape drive, it will be more efficient to write logical block addresses sequentially rather than nonsequentially since sequential logical block addresses will be written next to each other on the tape and will not involve significant repositioning of a write head of the tape drive. This is because the write head will already be in position to write LBA2 once it has completed writing LBA1. A similar advantage is realized when using disk drives.

Backup module 134 may additionally or alternatively prioritize among data having an age that satisfies the data retention time threshold by copying data that lends itself to rapid copying prior to data that is more time consuming to copy. For example, if backup module 134 is already copying a portion of the data stored by a logical page to backing store 120, backup module 134 may copy all of the data stored by the logical page to backing store 120 prior to copying any other data to backing store 120. Since copying the portion may involve reading the entire logical page from solid-state storage media 110 anyway (because the storage controller 104 reads a logical page at a time), the remaining portions of the logical page are readily available in read data pipeline 108 and can be more efficiently copied to backing store 120 than other data since copying other data will involve performing another time-consuming read from solid-state storage media 110.

Backup module 134 may additionally or alternatively prioritize among data having an age that satisfies the data retention time threshold by copying more important data prior to less important data. In one example, metadata (e.g., data stored on solid-state storage media 110 that is used in the operation of solid-state storage media 110) may be considered more important than user data because the metadata is used to operate the storage device 102. If the metadata was corrupt (e.g., due to retention errors) and not available in backing store 120, the user data stored on solid-state storage media 110 may be inaccessible if solid-state storage media 110 is inoperable due to the corrupt metadata. Accordingly, backup module 134 may copy metadata satisfying the data retention time threshold to backing store 120 prior to copying user data satisfying the data retention time threshold to backing store 120.

Once backup module 134 has copied data of solid-state storage media 110 that satisfies the data retention time threshold, backup module 134 may begin copying data of solid-state storage media 110 that does not satisfy the data retention time threshold to backing store 120. In doing so, backup module 134 may use one or more of the priorities described above in deciding an order in which to copy the data to backing store 120.

Eventually, storage device 102 may be detached from host computing system 114. When detached, storage device 102 may be configured in a nonoperational state in which data cannot be written to storage device 102 or read from storage device 102. For example, storage device 102 may be powered off or, alternatively, may remain powered, but a software driver for storage device 102 might not be loaded or operational. In addition, in certain embodiments, when the storage device 102 is attached, the software driver for storage device 102 may perform internal management operations to mitigate data retention errors. For example, in one embodiment, the software driver for storage device 102 may periodically refresh all data on the media or a subset of data on the media such that the refreshed data is not subject to data retention errors. However, detaching or powering off the storage device 102 may result in no refresh management operations for data on the storage device 102 media.

In detaching storage device 102, the user may have an expectation that data stored on storage device 102 prior to detaching will be available when storage device 102 is reattached in the future. Since it is possible that storage device 102 may be detached for a period of time longer than the data retention time threshold of solid-state storage media 110, any data that has not yet been copied to backing store 120 is copied to backing store 120 prior to storage device 102 becoming detached. As a result, if storage device 102 is nonoperational for a period of time longer than the data retention time threshold, when storage device 102 becomes operational, backup module 134 may copy data from backing store 120 to solid-state storage media 110 if data of solid-state storage media 110 is corrupt due to retention errors.

When storage device 102 has been detached for a period of time and is then reattached (e.g., by restoring power to storage device 102 or by enabling or activating the software driver of storage device 102), the data stored by solid-state storage media 110 is likely to include retention errors. The number of retention errors may be related to an amount of time that storage device 102 was detached. If storage device 102 was detached for a few hours, the data may include only a few retention errors. On the other hand, if storage device 102 was detached for a period of time approaching the data retention time interval, the data may include many retention errors.

As was discussed above, retention errors are due to the passage of time and do not necessarily indicate that a particular erase block of solid-state storage media 110 is faulty since all of the erase blocks of solid-state storage media 110 will eventually lose their data if solid-state storage media 110 remains detached long enough. Accordingly, it may not be efficient to retire erase blocks having retention errors resulting from time during which storage device 102 was detached since these erase blocks may operate acceptably when storage device 102 is reattached. Storage controller 104 may employ methods that prevent such erase blocks from being retired due to retention errors resulting from detached time.

According to one method, storage controller 104 reads data from an erase block of solid-state storage media 110, for example, by reading physical erase block 604aa of logical erase block 602a (see FIG. 6). Storage controller 104 then determines that an error count for the read data satisfies a retirement criteria for retiring the erase block. In other words, the severity of the error count justifies taking the erase block out of service because it appears that the erase block is not reliably storing data.

Storage controller 104 then determines whether the read of the erase block was the first original read of the erase block since storage device 102 commenced its current operating state (i.e., since storage device 102 was reattached). The first original read of the erase block is the first read of original data stored in the erase block at the time storage device 102 commenced its current operating state.

Some first reads are not first original reads. For example, storage controller 104 may read data from an erase block for the first time after storage device 102 commences its current operating state. If the erase block was programmed with new data after the commencement of the current operating state and prior to the read, such a read would not be a first original read since this read does not involve reading original data stored by solid-state storage media 110 prior to the commencement of the current operational state.

Continuing now with the method, if storage controller 104 determines that the read was a first original read, storage controller 104 may defer retirement of the erase block because the errors may be retention errors resulting from detached time of storage device 102. If storage controller 104 determines that the read was not a first original read, storage controller 104 may retire the erase block. In either case, backup module 134 may copy data from backing store 120 to solid-state storage media 110 to replace the errored data and storage controller 104 may provide the replacement data to a user. In copying the replacement data to solid-state storage media 110, backup module 134 may write the replacement data in a different erase block since backup module 134 may write the replacement data to an append point of a log (discussed above) rather than writing the replacement data back into the erase block from which the errored data was read.

Storage controller 104 may then program the erase block from which the errored data was read with new data or with the same data. Storage controller 104 may then perform a subsequent read of the erase block and determine that an error count for the subsequently read data satisfies the retirement criteria. Storage controller 104 then determines that the subsequent read was not the first original read of the data from the erase block and therefore retires the erase block. In this situation, the errors present in the subsequent read are probably not retention errors as long as the subsequent read occurs shortly after the erase block is programmed. Accordingly, the erase block is retired because of some physical fault or degradation of the erase block and not because of retention errors resulting from nonoperational time of storage device 102.

This method prevents unnecessary retirement of erase blocks by allowing an erase block that would otherwise have been retired to have a second chance as long as the second read from the logical erase block does not justify retirement of the erase block.

In one embodiment, storage controller 104 may monitor first original reads from solid-state storage media 110. If a threshold number or percentage of the first original reads satisfy the retirement criteria, there may be a large number of retention errors in the data stored by solid-state storage media 110, perhaps because storage device 102 was nonoperational for a period approaching or exceeding the data retention time interval. In this case, it may be more efficient to suspend further reads from solid-state storage media 110 and replace data stored by solid-state storage media 110 with data stored by backing store 120 than to use the method described above in which the first original read of each erase block is examined.

In one embodiment, all or portions of age module 132 and backup module 134 may be implemented by a processor of host computing system 114 rather than hardware of storage controller 104.

The invention claimed is:

1. A method, comprising:
   determining an age for a set of data stored on a non-volatile storage device;
   copying the set of data to a backing store responsive to the age satisfying a data retention time threshold;
   in response to the set of data on the non-volatile storage device not being corrupted, servicing a request for the set of data from the non-volatile storage device, wherein the servicing is subsequent to the copying;
   retrieving a copy of the set of data from the backing store in response to determining that errors in the set of data on the non-volatile storage device are not correctable using an error correcting code stored in an erase block; and
   writing the copy of the set of data to the non-volatile storage device.

2. The method of claim 1, further comprising:
   executing a storage operation that modifies data previously stored on the non-volatile storage device; and
   copying the modified data to the backing store within a data retention time interval of the non-volatile storage device.

3. The method of claim 1, further comprising:
   reading data from another erase block of the non-volatile storage device;
   determining that an error count for the read data satisfies a retirement criteria; and
   determining that reading the data comprises a first original read of the data from the other erase block after the non-volatile storage device commenced a current operating state and, in response, deferring retirement of the other erase block.

4. The method of claim 3, further comprising:
   performing a subsequent read of data from the other erase block;
   determining that an error count for the subsequently read data satisfies a retirement criteria; and
   determining that the subsequent read was not the first original read of the data from the other erase block after the non-volatile storage device commenced the current operating state and, in response, retiring the other erase block.

5. The method of claim 3, wherein the other erase block is a logical erase block comprising at least one physical erase block from each of a plurality of solid-state storage elements within an array.

6. The method of claim 1, further comprising:
determining that a first subset of data stored on the non-volatile storage device is modified less frequently than a second subset of the data stored on the non-volatile storage device, wherein the first subset and the second subset have ages that fail to satisfy the data retention time threshold; and
copying the first subset to the backing store, but not the second subset.

7. The method of claim 1 wherein:
the copying is performed within a data retention interval of the non-volatile storage device; and
the data retention time threshold is less than the data retention interval.

8. The method of claim 1, wherein the set of data is copied in sequential order based on logical block addresses associated with the set of data.

9. The method of claim 1, further comprising:
prior to shutting down the non-volatile storage device, copying data stored on the non-volatile storage device to the backing store independent of an age of the data.

10. A storage controller, comprising:
an operations module configured to satisfy storage operations using a non-volatile storage device;
an age module configured to determine an age for data stored on the non-volatile storage device;
a backup module configured to copy data of the non-volatile storage device having an age that satisfies a data retention time threshold to a dedicated backing store, wherein the copied data is some, but not all, of the data stored on the non-volatile storage device;
wherein the backup module is configured to retrieve a copy of the data from the dedicated backing store in response to the operations module determining that errors in the data are not correctable using an error correcting code stored in an erase block;
wherein the operations module is configured to write the copy of the data to the non-volatile storage device; and
wherein the operations module, the age module, and the backup module comprise one or more of logic hardware and a non-transitory computer readable medium having executable code stored thereon.

11. The storage controller of claim 10, wherein:
the operations module is configured to execute a storage operation that modifies data previously stored on the non-volatile storage device; and
the backup module is configured to copy the modified data to the dedicated backing store within a data retention time interval of the non-volatile storage device.

12. The storage controller of claim 10, wherein the operations module is configured to:
read data from another erase block of the non-volatile storage device;
determine that an error count for the read data satisfies a retirement criteria;
determine that reading the data comprises a first original read of the data from the other erase block after the non-volatile storage device commenced a current operating state; and
in response, defer retirement of the other erase block.

13. The storage controller of claim 12, wherein the operations module is configured to:
perform a subsequent read of data from the other erase block;
determine that an error count for the subsequently read data satisfies a retirement criteria;
determine that the subsequent read was not the first original read of the data from the other erase block after the non-volatile storage device commenced the current operating state; and
in response, retire the other erase block.

14. A system, comprising:
a non-volatile storage device;
a dedicated backing store configured for communication with the non-volatile storage device;
a storage controller configured to:
satisfy storage operations using the non-volatile storage device;
determine an age for data stored on the non-volatile storage device;
copy the data to the dedicated backing store responsive to the age satisfying a data retention time threshold;
subsequent to copying the data, continue to satisfy storage operations associated with the data using the non-volatile storage device unless the data is corrupted;
read data from an erase block of the non-volatile storage device;
determine that an error count for the read data satisfies a retirement criteria;
determine whether reading the data constitutes an initial read from the erase block after the non-volatile storage device commenced a current operating state; and
in response to the reading constituting an initial read, defer retirement of the erase block.

15. The system of claim 14, wherein the storage controller is configured to:
execute a storage operation that modifies data previously stored on the non-volatile storage device; and
copy the modified data of the non-volatile storage device to the dedicated backing store within a data retention time interval of the non-volatile storage device.

16. The system of claim 14, wherein the storage controller is configured to:
perform a subsequent read of data from the erase block;
determine that an error count for the subsequently read data satisfies a retirement criteria; and
in response to the subsequent read not constituting the initial read, retire the erase block.

17. The system of claim 14, wherein the storage controller is configured to:
retrieve a copy of the data from the dedicated backing store in response to determining that errors in the data on the non-volatile storage device are not correctable using an error correcting code; and
write the copy of the data to the non-volatile storage device.

* * * * *